United States Patent [19]

McCarty et al.

[11] 4,298,654

[45] Nov. 3, 1981

[54] POWDERED ELASTOMERS AND PROCESS THEREFOR

[75] Inventors: John C. McCarty, Elyria; Terrence E. Wagner, Avon Lake, both of Ohio

[73] Assignee: The B. F. Goodrich Company, Akron, Ohio

[21] Appl. No.: 144,100

[22] Filed: Apr. 28, 1980

[51] Int. Cl.$^3$ .............................................. B32B 5/16
[52] U.S. Cl. .................................... 428/407; 427/214; 427/220; 427/222; 428/403; 428/518; 428/519; 260/17 R
[58] Field of Search ............... 428/407, 403, 518, 519; 427/222, 214, 220; 260/17 R

[56] References Cited

U.S. PATENT DOCUMENTS

| | | | |
|---|---|---|---|
| 3,494,784 | 2/1970 | DeCoene | 427/222 |
| 3,813,259 | 5/1974 | Neubert | 427/222 |
| 4,119,759 | 10/1978 | Fischer | 428/407 |

FOREIGN PATENT DOCUMENTS

| | | |
|---|---|---|
| 54-07448 | 1/1979 | Japan . |
| 54-07449 | 1/1979 | Japan . |

*Primary Examiner*—Ellis P. Robinson
*Attorney, Agent, or Firm*—George A. Kap; J. H. Powell, Jr.

[57] ABSTRACT

A powdered, free-flowing elastomer is prepared by mixing, in a preferred embodiment, a nitrile latex with sodium carboxymethylcellulose until the mixture thickens, adding the latex mixture to a coagulant solution with agitation, also adding polyvinyl chloride coating latex to the coagulant solution, filtering the liquid, drying the filter cake, and recovering the product having an average particle size of less than about 1 millimeter. During coagulation, the cellulose salt is converted to the insoluble aluminum CMC gel.

15 Claims, No Drawings

POWDERED ELASTOMERS AND PROCESS THEREFOR

BACKGROUND OF THE INVENTION

In a conventional practice, elastomer latex is coagulated to form raw rubber in the form of small crumbs of about 3 to 5 millimeters particle size, which are then filtered, washed to remove soap, and dried. Raw rubber is a tacky material which agglomerates readily into large chunks or bales. Anticaking agents have been admixed in the past with raw crumb rubber to maintain it in particulate form, however, even these agents are not effective in maintaining raw rubber in free-flowing state and they may be detrimental to the inherent properties of rubber.

In commercial practice, raw rubber is usually delivered in large chunks or bales which may be subdivided by cutting into smaller pieces which are subsequently processed in a conventional manner by mixing with other ingredients. Since such mixing is an energy intensive procedure, the use of powdered, friable rubber would substantially reduce energy requirements.

The prior art has dealt with the problem of rendering the raw rubber in a free-flowing powdered form. U.S. Pat. No. 3,813,259 to Neubert, in a preferred embodiment, discloses a process for obtaining dry, non-adhering particles by adding styrene-butadiene latex to a coagulant solution whereby the latex is coagulated to produce raw rubber in the form of crumbs. This process is completed by heating the resulting mixture to an elevated temperature, adding a coating resin latex to the heated mixture in order to deposit a layer of the coating resin on the particles of raw rubber, and recovering an allegedly nonagglomerating particulate product with a particle diameter on the order of one quarter of an inch.

Japanese Pat. Nos. 54(1979)-7448 and 7449 relate to a process for preparing powdered polychloroprene rubber. This is accomplished by admixing methylcellulose, hydroxymethyl cellulose or polymethyl vinyl ether with polychloroprene latex and a sulfate or a carbonate of an alkali metal. This mixture is maintained at room temperature or heated to above 50° C. and added dropwise with stirring to a coagulant solution of an alkaline earth chloride or nitrate maintained at a temperature from about 30° C. to above 50° C. A coating resin latex is added to the coagulant with mixing for about one hour following which, the mixture is filtered, the filter cake is washed with dilute acid and then with water, and dehydrated with a centrifuge to obtain a fluid powdery rubber which is easily pulverizable. The product, for the most part, allegedly consists of particles smaller than 14 mesh or 3 millimeters.

SUMMARY OF THE INVENTION

This invention relates to powdered elastomers and to preparation thereof which involves mixing an elastomer latex with an alkali metal salt of a water-soluble cellulose ether, adding with stirring this mixture to a coagulant bath to convert latex to raw elastomeric particles and adding a coating resin to the coagulant bath with stirring. During coagulation, the water-soluble cellulose ether salt is converted to an insoluble gel. Water is removed by filtration and raw powdered elastomer is recovered by washing and drying the filter cake without any pulverization. The product is recovered in free-flowing powder form with a particle size of generally less than 1 millimeter. The product does not agglomerate on storage for at least six months at ambient room temperature.

DETAILED DESCRIPTION OF THE INVENTION

The invention is directed to a process and to a free-flowing product in the form of powder particles each comprising an elastomeric resin having dispersed therein an insolubilized cellulose ether having an adhering layer of a coating resin thereon. Amount of cellulose ether in the product can vary from 1 to 15 parts, preferably 3 to 10 parts, and amount of the coating resin can vary from 0.5 to 35 parts, preferably 2 to 10 parts, on the basis of 100 parts of the elastomeric resin solids.

The products of this invention are powdered elastomers with a particle size of less than about 1 millimeter. The product is insoluble in water at room temperature and at temperatures below and above room temperature. It is made by admixing a water-soluble cellulose ether salt with an elastomeric latex and adding this mixture to a coagulant solution maintained at room temperature or heated to a temperature of up to about 100° C. A coating resin, preferably in the form of an emulsion, is added to the coagulant mixture which appears to coat the coagulated elastomeric particles. The product is recovered by removing water by filtration, washing the filter cake with water a number of times and then drying at an elevated temperature for several hours. The product that is obtained at this point is in powder form and does not require any pulverization or breaking up.

Cellulose ether salt used pursuant to the invention described herein should be well dispersed in the latex, such as with an air driven mixer, to the point when the latex appears to thicken, indicating solution of the cellulose ether salt in the latex. Depending on the conditions employed, duration of the mixing step can be on the order of about 5 minutes to one hour. Cellulose ether that is admixed with the latex can be in a dry, powder form or in the form of an aqueous solution, such as a 2% aqueous solution thereof. When the elastomeric latex and the cellulose ether salt are mixed, a small amount of a suitable antioxidant for the elastomer can also be added in an amount of up to a few percent, on the basis of latex solids. The mixture of latex, cellulose ether and antioxidant may have a solids concentration of about 5 to 30%, preferably on the order of about 10%.

To promote coagulation of the elastomeric latex and the coating resin, that is also added to the coagulant solution, temperature of the coagulant solution should be in the range of about room temperature and up to about 100° C. It is preferred if the coating resin is added to the coagulant solution diluted to about 20% solids. Coating resin is added to the coagulant solution following addition of the elastomeric latex and cellulose ether mixture. Amount of the coating resin can vary from 1 to 40 parts, preferably from 3 to 20 parts per 100 parts of elastomeric latex solids. Upon addition to the coagulant solution of the elastomeric latex and cellulose ether mixture, the coating resin, and any other attendant additive, solids concentration of the coagulant mixture after coagulation should be as high as possible while retaining the capability of mechanical stirring. Concentration of the coagulant itself in the aqueous coagulating solution is about 0.1 to 20 parts, preferably 1 to 10 parts per 100 parts of elastomeric latex solids.

Following addition of elastomeric latex and cellulose ether to the coagulant solution, the resulting mixture is stirred for about one-half hour and after adding the coating resin, the resulting coagulant mixture should be stirred for over one-half hour, such as about one hour. The product is recovered by filtering out water, washing the filter cake several times with tap water at about 20° to 100° C., filtering again and drying in an air circulating oven until moisture is reduced to 1% or less.

Examination of product particles under a microscope shows a layer of the coating resin adhering to the matrix of the elastomeric resin and the cellulose ether. Judging by the relative amount of fines, handling of the product does not appear to peel or separate the coating resin to any significant degree, as is the case with many of the prior art products of this nature.

In order to verify operability of this process with respect to an obvious variation thereof, preparation of the product was carried out by blending carboxymethyl cellulose salt, elastomeric latex and coating resin. This mixture was then coagulated and the product was recovered, as disclosed herein. Unexpectedly, the resulting product was sticky and agglomerated easily, indicating unsuitability of admixing the cellulose ether with the elastomeric latex and the coating resin, and the criticality of adding the elastomeric latex to the coagulant solution separately from the coating resin.

Elastomeric latices referred to herein encompass high polymers which have the property of extensibility and elastic recovery. To obtain these properties, the polymers should be above their glass transition temperature, be amorphous in the unstretched state, and contain a network of cross-links to restrain gross mobility of the chains. Examples of suitable synthetic elastomeric latices include acrylonitrile-butadiene, styrene-butadiene, polybutadiene, polyacrylates, isobutylene-isoprene rubber, and polychloroprene.

Acrylate rubber latices are prepared by copolymerizing an acrylate, such as ethyl acrylate, with a few percent of certain cure-site monomers. Butyl rubber latex is prepared by copolymerizing isobutylene with a small amount of a diolefin, such as isoprene, to promote vulcanization. All of these latices and others mentioned above are well known in the art. For purposes of exemplification, the nitrile latices, and their preparation, will now be described in more detail.

The nitrile elastomeric latex is prepared by polymerization of a nitrile and a diene. The nitrile or a mixture of such nitriles that are polymerized with a diene have the formula

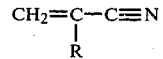

where R is hydrogen, a halogen such as chlorine, an alkyl radical of 1 to 8 carbon atoms but preferably 1 to 2, or an aryl radical. Amount of the diene that is polymerized with a nitrile is in excess of 40% and preferably in excess of about 60%. One or a mixture of dienes can be polymerized with the nitrile, such dienes are defined by the following formula

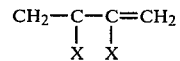

where each X separately can be hydrogen, a halogen such as chlorine, an alkyl radical of 1 to 5 carbon atoms, or an aryl radical. Particularly suitable nitrile latices include those prepared by emulsion copolymerization of butadiene, chloroprene, or isoprene with acrylonitrile, chloroacrylonitrile, methacrylonitrile, or ethacrylonitrile. Especially preferred nitrile latices are those prepared by emulsion polymerization of 60 to 80 parts by weight butadiene with about 40 to 20 parts acrylonitrile.

Up to about 20% by weight of the diene and/or the nitrile can be replaced by other non-crosslinking ethylenically unsaturated monomers copolymerizable with the diene. Examples of such monomers are the various vinyl monomers including acrylic and methacrylic acids and derivatives thereof, vinyl halides, vinyl esters, vinyl ethers, and vinyl aromatic monomers.

Reaction between a nitrile and a diene to produce a nitrile latex is carried out in a conventional manner. The monomers are emulsified in water with the aid of emulsifying agents. Polymerization medium contains a suitable free radical generating catalyst and an activating system, including a chain-transfer agent. Polymerization is carried out in the temperature range of below 0° C. and up to about 80° C. in absence of oxygen preferably to less than 100% completion, at which time an inhibitor is added to terminate polymerization.

Pursuant to another embodiment of this invention, elastomeric latex can be used in a compounded form for various applications, such as production of raw rubber. In such an instance, elastomeric latex is compounded with such ingredients as fillers, activators, accelerators, pigments, plasticizers, antioxidants, curing agents, etc. The compounded latex can then be mixed with a cellulose ether and treated in essentially the same way as uncompounded elastomeric latex by following the procedure outlined herein for preparing powdered product.

Suitable cellulose derivatives for our purpose are water-soluble cellulose ethers, specific examples of which include sodium carboxymethylcellulose, sodium carboxymethylhydroxyethylcellulose, hydroxyethylcellulose, methylcellulose, hydroxymethylcellulose, methylhydroxypropylcellulose, ethylhydroxyethylcellulose, methylethylcellulose, and methylhydroxyethylcellulose. As indicated above, CMC and CMHEC are used in the form of alkali metal salts for the reason that they form an insoluble gel on reaction with a trivalent metal ion salt, such as aluminum salt. Generally speaking, any cellulose derivative which is initially water-soluble and which is rendered insoluble or cross-linked at higher temperature or by means of a coagulating agent, such as alum, should be suitable for our purpose. Generally speaking, such ethers include sodium carboxyalkylcelluloses, sodium carboxyalkylhydroxyalkylcelluloses, hydroxyalkylcelluloses, alkylcelluloses, alkylhydroxyalkylcelluloses, and dialkylcelluloses, where each alkyl group can independently contain 1 to 4 carbon atoms.

With respect to sodium CMC in particular, which constitutes the preferred embodiment of this invention, its molecular weight should be relatively low, about 90,000 to 100,000 in a preferred embodiment, with a medium viscosity range at 25° C. of about 15 to 1000 cps and preferably 50 to 100 cps, measured in 2% aqueous solution, with a degree of substitution in the range of about 0.3 to 2, preferably 0.65 to 0.85. It was empirically determined that the use of higher viscosity CMC results in a latex which is too thick for the coagulation step and in difficult control of product particle size.

The use of a cellulose ether is critical to the production of a free-flowing powdered elastomer. When cellulose ether was omitted, the resulting product agglomerated readily.

The coagulant employed herein to coagulate elastomeric latex and to cross-link the cellulose ether is preferably a trivalent metal ion salt of such trivalent metal ions as aluminum, ferric, uranium and chromic. Preferred trivalent metal salt is aluminum sulfate, $Al_2(SO_4)_3$, or alum, i.e., $Al_2(SO_4)_3 \cdot 18H_2O$. As was already pointed out above, the dual function of the coagulant is to coagulate the elastomer and the coating resin latices and to insolubilize or cross-link the cellulose ether which is dispersed within the latex particles and which contributes to the formation of a free-flowing powdered product. Any coagulant which satisfies this criterion should be suitable for our purpose.

In the practice of this invention, suitable coating resins, preferably in latex form, include styrene-butadiene copolymers, polyvinyl chloride, polystyrene, polymethyl methacrylate, styrene-butadiene-divinylbenzene terpolymers, acrylonitrile-styrene-butadiene terpolymers, polyvinyl acetate, methyl methacrylate-methyl acrylate copolymers, vinyl chloride-vinylidene chloride copolymers, styrene-itaconic acid copolymers, styrene-acrylonitrile copolymers, and fluorine latices such as polyvinyl fluoride. Generally speaking, suitable resins are those with a glass transition point in excess of 30° C. These resins can be prepared by well known emulsion polymerization technique, which is appropriate for the practice of this invention. It is recommended to use a resin that is compatible with the eventual use of the product and also one that does not become ineffective as a partitioning agent by absorbance or solution into the elastomer or ingredients thereof. Polyvinyl chloride and styrene-butadiene latices containing 80 to 99% by weight styrene, are preferred coating resins.

The examples which follow are presented for the purpose of illustrating the invention disclosed herein and are not intended to limit the invention in any respect.

EXAMPLE 1

A mixture of about 10% solids was prepared by adding with stirring 823 grams of Hycar 1052 acrylonitrile-butadiene latex, 4 grams of phosphited polyalkyl polyphenol Geltrol antioxidant, and 10 grams of sodium carboxymethylcellulose to 1000 grams of demineralized water. The Hycar latex contained about 34% bound acrylonitrile and its solids concentration was 24.3%. This latex mixture was stirred for about one hour until the Hycar latex thickened. After adjusting pH of this mixture to about 10 by addition of dilute sodium hydroxide, the mixture was slowly added to a coagulating bath of 900 grams of coagulating solution containing 3.75% aluminum sulfate, or about 8% alum. The coagulant solution was maintained at about 60° C. Addition of the latex mixture to the coagulating bath took about 5 minutes. After addition of the latex mixture was completed, the contents of the coagulating bath were mixed for about one-half hour and then slow addition was commenced of 111 grams of Geon 151 polyvinyl chloride latex containing 20% latex solids with agitation for about one hour thereafter while maintaining temperature of the coagulating bath at about 60° C. Geon 151 PVC latex has inherent viscosity of 0.9 and is prepared by emulsion polymerization of vinyl chloride monomer. At this point, heat was removed and agitation of the contents of the coagulating bath was continued overnight with gradual cooling to room temperature. This mixture was filtered to remove water, washed with tap water at room temperature 3 times, and then dried in an air-circulating oven at 70° C. in about 5 hours until a powdery product was obtained. The resulting product was a free-flowing powder with an average particle size of 0.6 millimeter in diameter with highly uniform particle size distribution. Content of the polyvinyl chloride resin adhering to the product was 8.8%, which reflects a 93% utilization of the PVC resin.

EXAMPLE 2

A latex mixture was prepared by admixing 135 grams of Hycar 1422-X9 precrosslinked butadiene-acrylonitrile latex containing 34% acrylonitrile in the monomer charge, 1 gram of Geltrol antioxidant, and 132 grams of a 2% aqueous solution of sodium carboxymethylcellulose. This latex had a solids concentration of 37%. This mixture was slowly added to a coagulating bath containing 434 grams of a 3.92% aqueous alum solution maintained at about 60° C. and then 27.6 grams of a 20% aqueous dispersion of Geon 151 PVC latex was also slowly added to the coagulating bath. The contents of the coagulating bath were mixed for about one hour following addition of the PVC latex and then heat was removed and the bath was allowed to gradually cool overnight. After filtration, washing and drying, a free-flowing powdered product was recovered with an average particle size of about one-half millimeter.

EXAMPLE 3

A mixture of about 14% solids was prepared by adding with stirring 200 g of a 25% solids latex of a terpolymer of ethyl acrylate with less than 2% other cure-rate monomers with 50 g of water, 132 g of a 2% aqueous solution of sodium CMC, and 1.26 g of phosphited polyalkyl polyphenol Geltrol antioxidant. This latex mixture was stirred about an hour and then was added slowly to a solution of 17 g of alum in water at room temperature. The coagulation mass was then heated to 60° C., and at that temperature, 27.6 g of a 20% Geon 151 PVC latex was added slowly with agitation which was maintained for about 1 hour after all PVC was added. The solids were then separated out, washed 3 times with tap water at 50° C. and then dried at 70° C. for about 4 hours to a moisture content of about 1%. The product was a uniform free-flowing powder of average particle size 0.76 mm.

EXAMPLE 4

A mixture of 10% solids was prepared by adding with stirring 463 g of a 22% solids latex of a copolymer of styrene and 23.5% butadiene monomers with 399 g of water, 150 g of a 2% aqueous solution of sodium CMC, 2 g of phosphited polyalkyl polyphenol Geltrol antioxidant. This latex mixture was stirred about 1 hour and then was added slowly to a solution of 31.5 g of alum in water at about 60° C. After stirring at 60° C. for about one-half hour, 35 g of 20% Geon 151 PVC latex was added slowly with agitation which was maintained along with the 60° C. temperature for about 1 hour after the completion of the PVC addition. The solids were seperated, washed 3 times with cold water, and then dried in a circulating air oven at 70° C. until the moisture content was less than 1%. The product was of a uniform particle size of about 0.58 mm and was a free-flowing powder.

EXAMPLE 5

The Japanese patent, noted earlier, appears to be the closest prior art to the subject matter claimed herein. The following schematic diagrams are presented for the sake of promoting the understanding of the differences between the Japanese patent disclosure and the invention claimed herein:

A. Invention claimed herein:

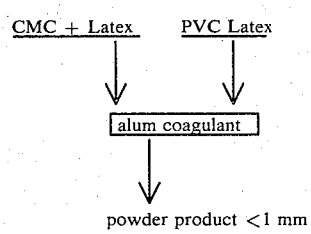

powder product <1 mm

B. Japanese patent:

MC or HMC + polychloroprene latex + alkali metal SO₄ or CO₃
↓
PVC Latex → alkaline earth metal Cl or NO₃ coagulant
↓
powder product <3 mm Many comparative experiments were conducted in order to determine the critical differences between the Japanese patent disclosure and the invention claimed herein. These experiments are summarized in Table I, below, in a manner which should facilitate comparison of procedures and results:

TABLE I

| | Starting Blend - Dry Parts | | | | | | | | |
|---|---|---|---|---|---|---|---|---|---|
| Process | Latex | Pts. | Cellulose | Pts. | A.O. | Pts. | Conc. % | Salt | Pts. |
| BFG Control A | NBR[1,2,3] | 100 | Carboxy-methyl[4] | 3 | Agerite Geltrol | 2 | 10.4 | — | — |
| BFG B | NBR[1] | 100 | Methyl[5] | 3 | Agerite Geltrol | 2 | 10.4 | — | — |
| BFG C | NBR[1] | 100 | Hydroxy-Ethyl[6] | 3 | Agerite Geltrol | 2 | 10.4 | — | — |
| BFG D | Polychloroprene | 100 | Carboxy-methyl | 3 | — | — | 14.0 | — | — |
| BFG E | SBR[8] | 100 | Carboxy-methyl | 3 | Agerite Geltrol | 2 | 10.4 | — | — |
| BFG F | Nat.[9] Rubber | 100 | Carboxy-methyl | 3 | Agerite Geltrol | 2 | 10.4 | — | — |

| | Coagulation | | | Post Coag. Treatment | | | | Dry Product Quality |
|---|---|---|---|---|---|---|---|---|
| Process | Salt | Pts | Temp °C. | Resin | Dry Pts | Temp °C. | Time-Hrs | |
| BFG Control A | Alum 3.1% | 10.3 | 60 | Geon 151 | 7 | 60 | 1 | Good Powder |
| BFG B | Alum 3.1% | 10.3 | 60 | Geon 151 | 7 | 60 | 1 | Good Powder Potential |
| BFG C | Alum 3.1% | 10.3 | 60 | Geon 151 | 7 | 60 | 1 | Good Powder Potential |
| BFG D | Alum 3.7% | 8.4 | 60 | Geon 151 | 7 | 60 | 1 | Good Powder Potential |
| BFG E | Alum 3.1% | 10.3 | 60 | Geon 151 | 7 | 60 | 1 | Good Powder |
| BFG F | Alum 3.1% | 10.3 | 60 | Geon 151 | 7 | 60 | 1 | No Powder |

| Process | Latex | Pts. | Cellulose | Pts. | A.O. | Pts. | Conc. % | Salt | Pts. |
|---|---|---|---|---|---|---|---|---|---|
| BFG G | NBR[1] | 100 | Carboxy-methyl | 3 | Agerite Geltrol | 2 | 10.4 | NA₂SO₄ | 13.9 |
| BFG H | NBR[1] | 100 | Carboxy-methyl | 3 | Agerite Geltrol | 2 | 10.4 | — | — |
| Jap. Pat. Ex. 5 Control I | Poly-[7] chloroprene | 100 | Methyl[5] | 3.33 | — | — | 14.3 | NA₂SO₄ | 13.9 |
| Jap. Pat. Ex. 5 Control J | Poly-[7] chloroprene | 100 | Methyl[5] | 3.33 | — | — | 14.3 | NA₂SO₄ | 13.9 |
| Jap. Pat. Ex. 5 Control K | NBR[1] | 100 | Methyl[5] | 3.33 | Agerite Geltrol | 2 | 12.3 | NA₂SO₄ | 13.9 |
| Jap. Pat. Ex. 5 | NBR[3] | 100 | Methyl[5] | 3.33 | Agerite Geltrol | 2 | 12.3 | NA₂SO₄ | 13.9 |

TABLE I-continued

Control L

| Process | Salt | Pts | Temp °C. | Resin | Dry Pts | Temp °C. | Time-Hrs | Dry Product Quality |
|---|---|---|---|---|---|---|---|---|
| BFG G | Alum 3.1% | 10.3 | 60 | Geon 151 | 7 | 60 | 1 | Good Powder Potential |
| BFG H | CA CL$_2$ 2.7% | 10.3 | 60 | Geon 151 | 7 | 60 | 1 | No Powder |
| Jap. Pat. Ex. 5 Control I | CA CL$_2$ 1.0% | 16.5 | 60 | Geon 151 | 18.3 | 60 | 1 | Good Powder |
| Jap. Pat. Ex. 5 Control J | Alum 1.7% | 16.3 | 60 | Geon 151 | 18.3 | 60 | 1 | No Powder |
| Jap. Pat. Ex. 5 Control K | CA CL$_2$ 1.0% | 16.5 | 60 | Geon 151 | 18.3 | 60 | 1 | No Powder |
| Jap. Pat. Ex. 5 Control L | CA CL$_2$ 1.0% | 16.5 | 60 | Geon 151 | 18.3 | 60 | 1 | Fair Powder Potential |

In the above table, the term "BFG" represents B. F. Goodrich, the assignee of this invention; term "Jap. Pat." stands for Japanese patent; the symbol " ▽ " identifies variations from the BFG or Japanese patent controls; and the numbers listed below identify the following:

1 Hycar 1052
2 Hycar 1092-80
3 Hycar 1422X9
4 Hercules 7MI
5 Dow Methocel A4M
6 Cellosize QP 300H
7 Dupont Neoprene 671
8 BFG SBR 4714
9 Wisconsin Latex & Adhesives (62%)

Hycar 1052 is poly(butadiene-acrylonitrile) latex containing about 34% bound acrylonitrile; Hycar 1092 is also a poly(butadiene-acrylonitrile) latex containing about 32% bound acrylonitrile; Hycar 1422 is pre-crosslinked poly(butadiene-acrylonitrile) latex containing about 34% acrylonitrile in the monomer charge; Hercules 7MI is carboxymethylcellulose; Dow Methocel A4M is methylcellulose; Cellosize QP 300H is hydroxyethylcellulose; DuPont Neoprene 671 is polychloroprene latex; BFG SBR 4714 is poly(styrene-butadiene) latex; and Wisconsin Latex and Adhesives designates 62% solids natural rubber latex.

The results in Table I indicate operability of methylcellulose and hydroxymethylcellulose, in addition to carboxymethylcellulose in the BFG process. Good powder potential, as this term is used in Table I, means that the powder was not entirely free-flowing but this quality might be improved by optimizing the quantitative parameters. It is noteworthy that the use of natural rubber latex (Experiment F) did not result in free-flowing powder and addition of sodium sulfate (Experiment G) did not appear to destroy the free-flowing character of the product although it does not appear that it provided any improvement. It should be recalled that the Japanese patent teaches the essential use of alkali metal SO$_4$ or CO$_3$ in admixture with polychloroprene latex and CMC or HMC. Experiment H has conclusively demonstrated that coagulants in this application, such as alum, and coagulants disclosed by the Japanese patent, such as calcium chloride, are not interchangeable. Experiment H represents BFG process wherein alum was replaced with calcium chloride, resulting in agglomerated product. This is confirmed by Experiment J which is a duplication of the Japanese patent process wherein calcium chloride coagulant was replaced with alum, wherein the resulting product agglomerated. Experiment K illustrates inoperability of the Japanese process with non-precrosslinked poly(butadiene-acrylonitrile) latex yet apparent powder potential for a product produced via the Japanese patent using precrosslinked latex in Experiment L. The pre-crosslinking characteristic of latex in Experiment L facilitates production of a free-flowing powder product.

Results in Table I also illustrate the sensitive nature of the process employed to produce powdered rubbers. The use of alum as coagulant affords a broad scope of application with respect to the different types of latices and celluloses that can be utilized. Surprisingly, alkali earth metal chlorides and nitrates, as coagulants, have a much more limited scope with respect to the types of latices and cellulosic substances that can be employed to produce a free-flowing powder product.

We claim:

1. A free-flowing product in the form of powder particles coagulated with a trivalent metal salt coagulant comprising a synthetic elastomeric material having dispersed therein an insolubilized cellulose ether gel and having an adhering layer of a coating resin thereon.

2. Product of claim 1 wherein the powder particles are less than about 1 millimeter average particle size comprising 1 to 15 parts of the cellulose ether and 0.5 to 35 parts of the coating resin per 100 parts of the elastomeric material.

3. Product of claim 1 comprising 3 to 10 parts of the cellulose ether and 2 to 10 parts of the coating resin per 100 parts of the elastomeric material.

4. Product of claim 3 which is non-agglomerating on storage for at least 6 months at ambient room temperature wherein the elastomeric material is selected from acrylonitrile-butadiene copolymers, styrene-butadiene copolymers, polyacrylates, polyisoprene, isobutylene-isoprene rubber, polybutadiene, and mixtures thereof; the coating resin has glass transition temperature in excess of 30° C. and is selected from polyvinyl choride, copolymers of styrene and butadiene containing at least 80% by weight styrene, polystyrene, polymethyl methacrylate, styrene-butadiene-divinylbenzene terpolymers, acrylonitrile-styrene-butadiene terpolymers, polyvinyl acetate, methyl methacrylate-methyl acrylate copolymers, vinyl chloride-vinylidene chloride copolymers, styrene-itaconic acid copolymers, styrene-acrylonitrile copolymers, fluorine latices, and mixtures thereof; and the cellulose ether is selected from water-soluble cellulose ethers that are insolubilized by means of the coagulating agent.

5. Product of claim 4 wherein the elastomeric material and the coating resin are in a coagulated form and the cellulose ether is cross-linked and is selected from alkali metal carboxyalkylcelluloses, alkali metal hydroxyalkylcelluloses, alkylcelluloses, alkylhydroxyalkylcelluloses, and dialkylcelluloses, where each alkyl group independently can contain 1 to 4 carbon atoms.

6. Product of claim 5 wherein the elastomeric material is selected from acrylonitrile-butadiene copolymers containing at least a preponderance of butadiene, the coating resin is polyvinyl chloride, and the cellulose ether is insolubilized carboxymethylcellulose.

7. Process for preparing a free-flowing product in the form of powder particles comprising adding synthetic elastomeric latex and an alkali metal salt of a water-soluble cellulose ether to a trivalent metal salt coagulating solution, stirring the coagulating solution and the additives therein, adding to the coagulating solution a coating latex, stirring the coagulating solution and the additives therein, and recovering the product in free-flowing powder form.

8. Process of claim 7 including the step of pre-mixing the elastomeric latex and the cellulose ether and adjusting pH thereof to the alkaline side before adding the mixture to the coagulating solution, amount of the cellulose ether being in the range of 1 to 15 parts, amount of the coagulant in the coagulating solution being 1 to 20 parts, and amount of the coating latex solids being 1 to 40 parts, these amounts being based on 100 parts of the elastomeric latex solids.

9. Process of claim 8 wherein amount of the cellulose ether is 3 to 10 parts, amount of the coagulant is 3 to 10 parts, and amount of the coating latex solids is 3 to 20 parts, the cellulose ether is selected from water-soluble cellulose ethers that are insolubilized by the coagulant; the elastomeric latex is selected from latices of acrylonitrile-butadiene copolymers, styrene-butadiene copolymers, polyisoprene, polybutadiene, polyacrylates, isobutylene-isoprene rubber, and mixtures thereof; the coating latex is selected from latices of polyvinyl chloride, copolymers of styrene and butadiene containing at least 80% by weight styrene, polyvinyl chloride, polystyrene, polymethyl methacrylate, styrene-butadiene-divinylbenzene terpolymers, acrylonitrile-styrene-butadiene terpolymers, polyvinyl acetate, methyl methacrylate-methyl acrylate copolymers, vinyl chloridevinylidene chloride copolymers, styrene-itaconic acid copolymers, styrene-acrylonitrile copolymers, fluorine latices, and mixtures thereof; the cellulose ether is selected from water-soluble cellulose ethers that are insolubilized by means of coagulating agents; and the coagulant is selected from those capable of insolubilizing the cellulose ether and coagulating the elastomeric latex and the coating latex.

10. Process of claim 9 wherein the cellulose ether and the elastomeric latex are in the aqueous solution containing solids on the order of about 10%, mixing of the cellulose ether and the elastomeric latex is continued until thickening of the mixture takes place, concentration of the coagulant in the coagulating solution is about 0.1 to 20%, the cellulose ether is selected from alkali metal carboxyalkylcelluloses, alkali metal carboxyalkylhydroxyalkylcelluloses, hydroxyalkylcelluloses, alkylcelluloses, alkylhydroxyalkylcelluloses, and dialkylcelluloses, where each alkyl group independently contains 1 to 4 carbon atoms.

11. Process of claim 10 including the step of maintaining temperature of the coagulating solution and additives therein at about room temperature up to about 100° C.; wherein the coagulant is alum.

12. Process of claim 11 including the steps of agitating for about one-half hour or longer the coagulating solution during and/or after making the additions of ingredients to the coagulating bath, and agitating the coagulating solution after addition of ingredients is completed for about one-half hour or longer.

13. Process of claim 12 wherein the elastomeric resin is selected from acrylonitrile-butadiene copolymers containing at least a preponderance of butadiene, the cellulose ether is sodium carboxymethylcellulose, and the temperature of the coagulating solution and additives therein is about 60° to 80° C.

14. Process of claim 13 wherein the coagulant is alum and the process further includes the steps of removing solid matter with water, and drying the solid matter to recover a free-flowing powdered product having average particle size of less than about 1 millimeter.

15. Process of claim 14 wherein said drying step is continued until moisture of the product is reduced to 1% or less and the product is non-agglomerating on storage for at least 6 months at ambient room temperature.

* * * * *